(12) United States Patent
Bachmann et al.

(10) Patent No.: US 8,285,497 B2
(45) Date of Patent: Oct. 9, 2012

(54) METHOD FOR GRAVIMETRIC VOLUME DETERMINATION

(75) Inventors: Hans-Rudolf Bachmann, Buttikon (CH); Joerg Burmester, San Ramon, CA (US); Philipp Kull, Adliswil (CH); Daniel Ott, Baar (CH); Markus Thiel, Horgen (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 432 days.

(21) Appl. No.: 12/560,188

(22) Filed: Sep. 15, 2009

(65) Prior Publication Data

US 2010/0114507 A1    May 6, 2010

(30) Foreign Application Priority Data

Sep. 19, 2008    (EP) .................................... 08105382

(51) Int. Cl.
*G01F 17/00*    (2006.01)

(52) U.S. Cl. ......................................... 702/55; 702/101
(58) Field of Classification Search .................... 702/55, 702/101; 436/908; 374/14; 73/29.02, 64.56
See application file for complete search history.

(56) References Cited

U.S. PATENT DOCUMENTS

| | | | | |
|---|---|---|---|---|
| 5,122,315 | A | * | 6/1992 | Darley .......................... 264/40.1 |
| 5,677,517 | A | * | 10/1997 | Berger .......................... 177/161 |
| 7,829,800 | B2 | * | 11/2010 | Thiel et al. ..................... 177/180 |
| 2004/0044439 | A1 | | 3/2004 | Gueller et al. |

FOREIGN PATENT DOCUMENTS

| | | |
|---|---|---|
| EP | 1975577 A1 | 10/2008 |
| WO | 0203449 A2 | 1/2002 |
| WO | 0203449 A3 | 1/2002 |

* cited by examiner

*Primary Examiner* — Mohamed Charioui
*Assistant Examiner* — Elias Desta
(74) *Attorney, Agent, or Firm* — M. Reza Savari

(57) ABSTRACT

A method of gravimetric volume determination is described in which a load cell can be calibrated either outside of an analytic analyzer for gravimetric calibration of the analyzer, or in a fully automated manner inside the analyzer.

7 Claims, 5 Drawing Sheets

METHOD FOR GRAVIMETRIC VOLUME DETERMINATION

CROSS-REFERENCE TO RELATED APPLICATION

The present application claims the benefit of EP Appl. No. 08105382.9 filed Sep. 19, 2008, the content of which is hereby incorporated herein by reference in its entirety.

FIELD OF THE INVENTION

The invention is directed to a method and system for gravimetric volume determination of a liquid in a clinical diagnostic analyzer.

BACKGROUND OF INVENTION

In the field of clinical and molecular chemistry, e.g. in clinical diagnostic analyzer systems like clinical chemistry analyzer systems and molecular clinical diagnostic analyzer systems, it is necessary to measure very small liquid volumes in the microliter and even in the nanoliter range with sufficient accuracy, e.g. for calibrating automatic pipetting devices which are integral parts of analyzer systems of the above mentioned kinds. For this purpose the gravimetric volume determination is a convenient method. Conventional methods of this kind require a lot of manual handling and are therefore time consuming. This is so, in particular because the various apparatuses needed for performing gravimetric volume determination are not part of an automated system like a modern automatic clinical diagnostic analyzer system in which most of the necessary operations for carrying out the analysis of biological samples are nowadays highly automated and require very few manual handling steps. For instance, in the case of a conventional gravimetric volume determination each liquid volume to be measured has to be manually pipetted into a weighting container of a special weighting instrument, the control of the procedure and evaluation of results for the gravimetric volume determination are carried out by a computer connected with the weighting instrument, and in order to convert the measured result to the volume to be determined, the pertinent temperature, air pressure and humidity data has to be manually entered to the computer before performing a calibration of an automatic pipetting device of an analyzer system. The temperature, air pressure and humidity data to be measured may vary in a relatively wide range depending on the specific environment conditions at the place where the analyzer system is located. Moreover, since the location and environment of the analyzer system may be changed from time to time, it cannot be assumed that the pertinent temperature, air pressure and humidity data have stable values.

SUMMARY OF THE INVENTION

In a first aspect, the invention relates to a method for the gravimetric volume determination of a liquid volume in a clinical diagnostic analyzer comprising:
(a) calibrating a load cell, at a determined positioning, outside an analytic system using an internal or external weight for calibration,
(b) introducing the load cell into a housing,
(c) adjusting the positioning of the load cell to correspond to the positioning of the load cell during step (a),
(d) introducing the housing with the load cell into the analytic analyzer,
(e) introducing a liquid sample to be weighed into the load cell and transmitting an output signal generated by the load cell to an electronic processing unit, the output signal being representative of the weight of the sample,
(f) measuring the temperature of the environment of load cell with a temperature sensor and transmitting an output signal generated by this sensor to the electronic processing unit,
(g) measuring the air pressure of the environment of load cell with an air-pressure sensor and transmitting an output signal generated by this sensor to the electronic processing unit,
(h) measuring the humidity of the environment of load cell with an humidity sensor and transmitting an output signal generated by this sensor to the electronic processing unit, and
(j) processing in the electronic processing unit the output signals generated according to steps (a) to (e), the processing including the calculation of the volume of the liquid sample which corresponds to the weight of the liquid sample measured with load cell.

In a second aspect, the invention relates to a method for the gravimetric volume determination of a liquid volume in a clinical diagnostic analyzer comprising:
(a) introducing a load cell into a housing,
(b) calibrating the load cell, at a determined positioning, outside an analytic system using an internal or external weight for calibration,
(c) adjusting the positioning of the load cell to correspond to the positioning of the load cell during step (b),
(d) introducing the housing with the load cell into the analytic analyzer,
(e) introducing a liquid sample to be weighed into the load cell and transmitting an output signal generated by the load cell to an electronic processing unit, the output signal being representative of the weight of the sample,
(f) measuring the temperature of the environment of load cell with a temperature sensor and transmitting an output signal generated by this sensor to the electronic processing unit,
(g) measuring the air pressure of the environment of load cell with an air-pressure sensor and transmitting an output signal generated by this sensor to the electronic processing unit,
(h) measuring the humidity of the environment of load cell with a humidity sensor and transmitting an output signal generated by this sensor to the electronic processing unit, and
(j) processing in the electronic processing unit the output signals generated according to steps (a) to (e), the processing including the calculation of the volume of the liquid sample which corresponds to the weight of the liquid sample measured with load cell.

In a third aspect, the invention relates to a method for the gravimetric volume determination of a liquid volume in a clinical diagnostic analyzer comprising the automated steps of:
(a) transporting a weight for calibration to a load cell,
(b) calibrating the load cell with the weight,
(c) introducing a liquid sample to be weighed into the load cell and transmitting an output signal generated by the load cell to an electronic processing unit, the output signal being representative of the weight of the sample,
(d) measuring the temperature of the environment of load cell with a temperature sensor and transmitting an output signal generated by this sensor to the electronic processing unit, (e) measuring the air pressure of the environment of the load cell with an air-pressure sensor and transmitting an output signal generated by this sensor to the electronic processing unit, (f) measuring the humidity of the environment of the load cell with a humidity sensor and transmitting an output signal generated by this sensor to the electronic processing unit, and (g) processing the output signals generated according to steps (a) to (d), in the electronic processing unit the processing including the calculation of the volume of the liquid sample which corresponds to the weight of the liquid sample measured with load cell.

In a fourth aspect, the invention relates to a diagnostic analyzer system comprising:

(i) a housing containing:
a load cell for gravimetric volume determination,
a weighing container for receiving a liquid to be weighed with the load cell,
a windbreak which shields the weighing container from air flow,
an evaporation trap which prevents evaporation of liquid loaded into the weighing container,
a temperature sensor, an air-pressure sensor and a humidity sensor for sensing temperature, air pressure and humidity respectively at predetermined points within the housing,
an electronic processing unit for processing electrical output signals delivered by the load cell and by the sensors, and
a weight for calibrating the load cell,
(ii) a handler for transporting the weight for calibrating the load cell to the load cell.

DETAILED DESCRIPTION OF THE INVENTION

Figure 1:
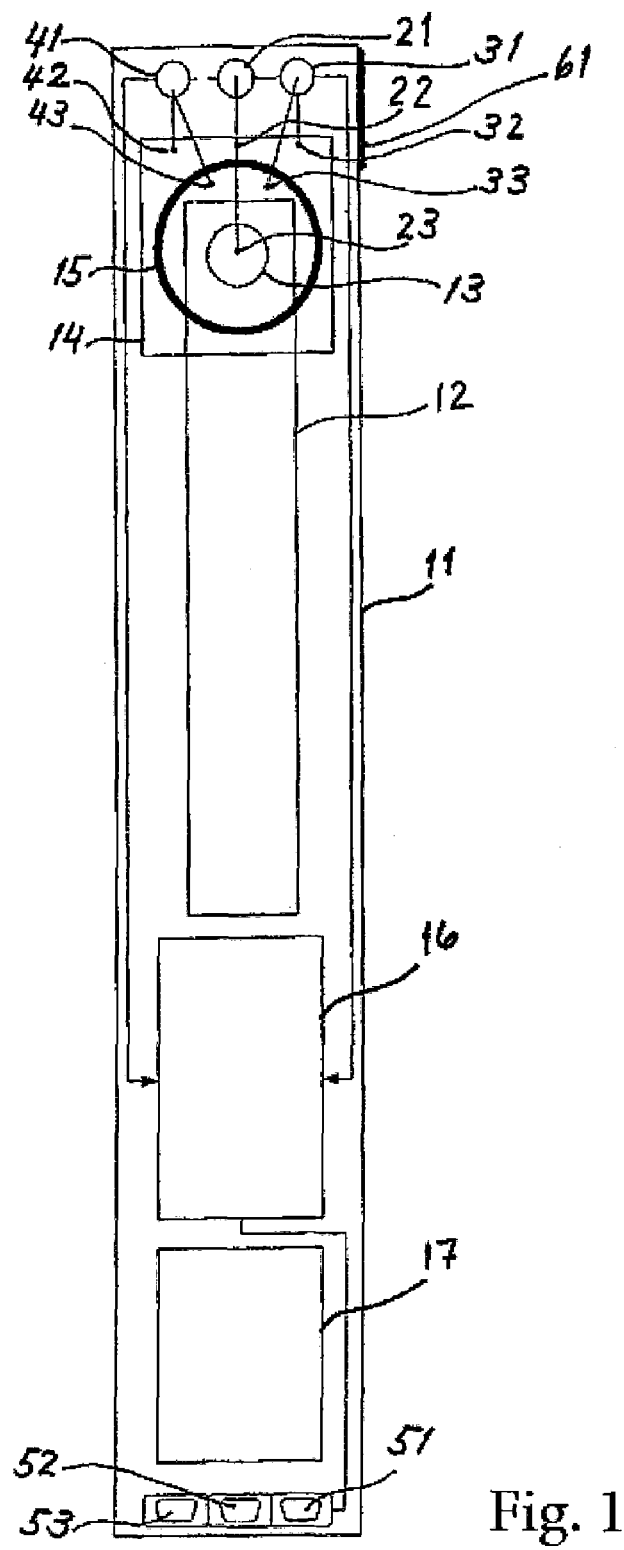
FIG. 1 shows a schematic top plan view of an embodiment of a device according to the invention.

As mentioned above, in an aspect, the invention relates to a method for performing gravimetric volume determinations which makes it possible to substantially reduce the amount of manual work and the amount of time required for performing reliable gravimetric volume determinations required for calibrating an automatic pipetting device in already existent and future automatic clinical diagnostic analyzer systems. Furthermore, the method allows for easier handling due to calibration of the load cell outside the diagnostic analyzer.

In a certain embodiment, the method for the gravimetric volume determination of a liquid volume in a clinical diagnostic analyzer is performed with a device comprising:
(i) a housing 11
the following components being comprised in the housing 11:
(i-a) optionally a temperature sensor 21,
(i-b) an air-pressure sensor 31 and
(i-c) a humidity sensor 41 for sensing temperature, air pressure and humidity respectively at predetermined points within the housing 11, and
(i-d) an electronic processing unit 16 for processing electrical output signals delivered by the sensors 21, 31, 41,
(ii) a load cell 12 for gravimetric volume determination, the load cell comprising:
(ii-a) a weighing container 13 for receiving a liquid to be weighed with the load cell 12, a windbreak 14 which shields the weighing container 13 from air flow,
(ii-b) an evaporation trap 15 which prevents evaporation of liquid loaded into the weighing container 13,
(ii-c) a temperature sensor 21, and an electronic processing unit 16 for processing electrical output signals delivered by the load cell 12 and by the sensor 21.

With this type of device, the method according to the invention can comprise the steps of:
(a) calibrating the load cell 12 outside of the analytic system using an internal or external weight for calibration,
(b) introducing the load cell into the housing 11,
(c) adjusting the positioning of the load cell to correspond to the positioning of the load cell during step (a),
(d) optionally introducing the housing with the load cell into the analytic analyzer, if the load cell is introduced into the housing outside of the analytic analyzer,
(e) introducing a liquid sample to be weighed into the load cell 12 and transmitting an output signal generated by the load cell 12 to the electronic processing unit 16, the output signal being representative of the weight of the sample,
(f) measuring the temperature of the environment of load cell 12 with the temperature sensor 21 and transmitting an output signal generated by this sensor to the electronic processing unit 16,
(g) measuring the air pressure of the environment of load cell 12 with the air-pressure sensor 31 and transmitting an output signal generated by this sensor to the electronic processing unit 16,
(h) measuring the humidity of the environment of load cell 12 with humidity sensor 41 and transmitting an output signal generated by this sensor to the electronic processing unit 16,
(j) processing in the electronic processing unit 16 the output signals generated according to steps (a) to (e), the processing including the calculation of the volume of the liquid sample which corresponds to the weight of the liquid sample measured with load cell 12, wherein step (b) may precede or succeed step (a).

Thus, according to the embodiment, the load cell is calibrated outside of the diagnostic analyzer. The load cell is then mounted in the housing, and if required, the housing placed in the diagnostic analyzer. The further gravimetric determination is preferably automated within the diagnostic analyzer. This adds flexibility to the gravimetric determination because the calibration of the load cell can be done at any location outside of the location of the calibration by gravimetric determination of the diagnostic analyzer, and the calibration of the load cell can be performed by service personnel or the customer, independent of the person who controls or initiates the calibration of the diagnostic analyzer by gravimetric determination.

In a certain embodiment, the positioning is performed using a bubble level. Thus, for calibration in step (a), the load cell is placed on a surface such that the bubble in the bubble level is positioned in the center of the bubble level window. After introducing the load cell in the housing and placing the housing in the analyzer, the position is again adjusted such that the air bubble in the bubble level is in the middle. Then the gravimetric determination can be performed inside the analyzer based on the calibration of the load cell outside of the analyzer.

The term "weight" as used herein refers to a calibration weight, i.e. a weight of a predetermined weight. Calibration of the load cell means that when the calibration weight is placed on the load cell, the load cell is set to the known weight of the calibration weight by the electrical output signal produced by the load cell.

In another embodiment, the method for the gravimetric volume determination of a liquid volume in a clinical diagnostic analyzer can be performed with a device comprising: a housing 11, the following components being contained in the housing 11:

a load cell 12 for gravimetric volume determination,
a weighing container 13 for receiving a liquid to be weighed with the load cell 12,
a windbreak 14 which shields the weighing container 13 from air flow,
an evaporation trap 15 which prevents evaporation of liquid loaded into the weighing container 13,
a temperature sensor 21, an air-pressure sensor 31 and a humidity sensor 41 for sensing temperature, air pressure and humidity respectively at predetermined points within the housing 11,
an electronic processing unit 16 for processing electrical output signals delivered by the load cell 12 and by the sensors 21, 31, 41, and
a weight for calibrating the load cell.

With this type of device, the method according to the invention can comprise the automated steps of:

(a) transporting a weight for calibration to the load cell,
(b) calibrating the load cell 12 with the weight,
(c) introducing a liquid sample to be weighed into the load cell 12 and transmitting an output signal generated by the load cell 12 to the electronic processing unit 16, the output signal being representative of the weight of the sample,
(d) measuring the temperature of the environment of load cell 12 with the temperature sensor 21 and transmitting an output signal generated by this sensor to the electronic processing unit 16,
(e) measuring the air pressure of the environment of load cell 12 with the air-pressure sensor 31 and transmitting an output signal generated by this sensor to the electronic processing unit 16,
(f) measuring the humidity of the environment of load cell 12 with humidity sensor 41 and transmitting an output signal generated by this sensor to the electronic processing unit 16, and
(g) processing in the electronic processing unit 16 the output signals generated according to steps (a) to (d), the processing including the calculation of the volume of the liquid sample which corresponds to the weight of the liquid sample measured with load cell 12.

According to this embodiment, the diagnostic analyzer can automatically calibrate the load cell, followed by calibration of the analyzer itself based on the calibration of the load cell. The term "calibration of the analyzer" as used herein refers to the gravimetric volume determination as described herein. The transporting of the weight to the load cell can preferably be performed by a handler. The handler is preferably a robotic arm. Such handlers are well known to the skilled person.

The present invention also relates to a diagnostic analyzer system comprising:

(i) a housing 11, the following components being contained in the housing 11:
a load cell 12 for gravimetric volume determination,
a weighing container 13 for receiving a liquid to be weighed with the load cell 12,
a windbreak 14 which shields the weighing container 13 from air flow,
an evaporation trap 15 which prevents evaporation of liquid loaded into the weighing container 13,
a temperature sensor 21, an air-pressure sensor 31 and a humidity sensor 41 for sensing temperature, air pressure and humidity respectively at predetermined points within the housing 11,
an electronic processing unit 16 for processing electrical output signals delivered by the load cell 12 and by the sensors 21, 31, 41,
a weight for calibrating the load cell, and
(ii) a handler for transporting the weight for calibrating the load cell to the load cell.

Handlers capable of gripping a weight in one position and transporting the weight to a second position are well known to the skilled person.

The main benefit obtained with a device according to the present application is that such a device is adapted for being incorporated into already existent or future diagnostic analyzers. The device can be a built-in component of an analyzer apparatus, or it can be placed into an analyzer apparatus for performing the methods of the present invention. A device according to the present application thus makes it possible to integrate the technical means necessary for performing reliable gravimetric volume determinations into already existent and future automatic clinical diagnostic analyzer systems and thereby the time and work required for performing reliable calibration of an automatic pipetting device by gravimetric volume determinations in such analyzers is substantially reduced. This is so, because most of the above mentioned manual steps of the conventional method for performing gravimetric volume determinations are carried out automatically, e.g. the pipetting of liquids into the weighing container is carried out with the automatic pipetting device of the analyzer, and the necessary temperature, air pressure and humidity data is obtained by sensors which are part of the device according to the present application, and such data is directly transmitted to an electronic unit for data processing which is also part of the device according to the invention. With a device according to the invention gravimetric volume determinations in a clinical diagnostic analyzer system are thus carried out automatically with a minimum of manual work required. Consequently the efficiency of existent clinical diagnostic analyzer systems is improved, because the delays caused by slowly performed, conventional gravimetric volume determinations are eliminated. Moreover the incorporation of the device according to the present invention into a clinical diagnostic analyzer system protects the delicate equipment used for gravimetric volume determinations from external disturbances and therefore more reliable measurement results are obtained.

The subject device will now be described in terms of more specific embodiments with reference to the accompanying drawings. These embodiments are purposely specifically set forth to aid the understanding of the invention, but are not to be construed as limiting the scope of the invention.

Certain embodiments of a device and a method for the gravimetric volume determination of a liquid volume according to the invention as well as a clinical diagnostic analyzer comprising a device according to the invention are described hereinafter.

A certain embodiment of a device for the gravimetric volume determination of a liquid volume is described hereinafter with reference to the accompanying drawing.

The structure chosen requires that each analyzer system has at least one standard rack for holding sample or reagent containers, that this rack has a specified shape and dimensions, and that the system includes areas for receiving such at least one rack.

Figure 2:
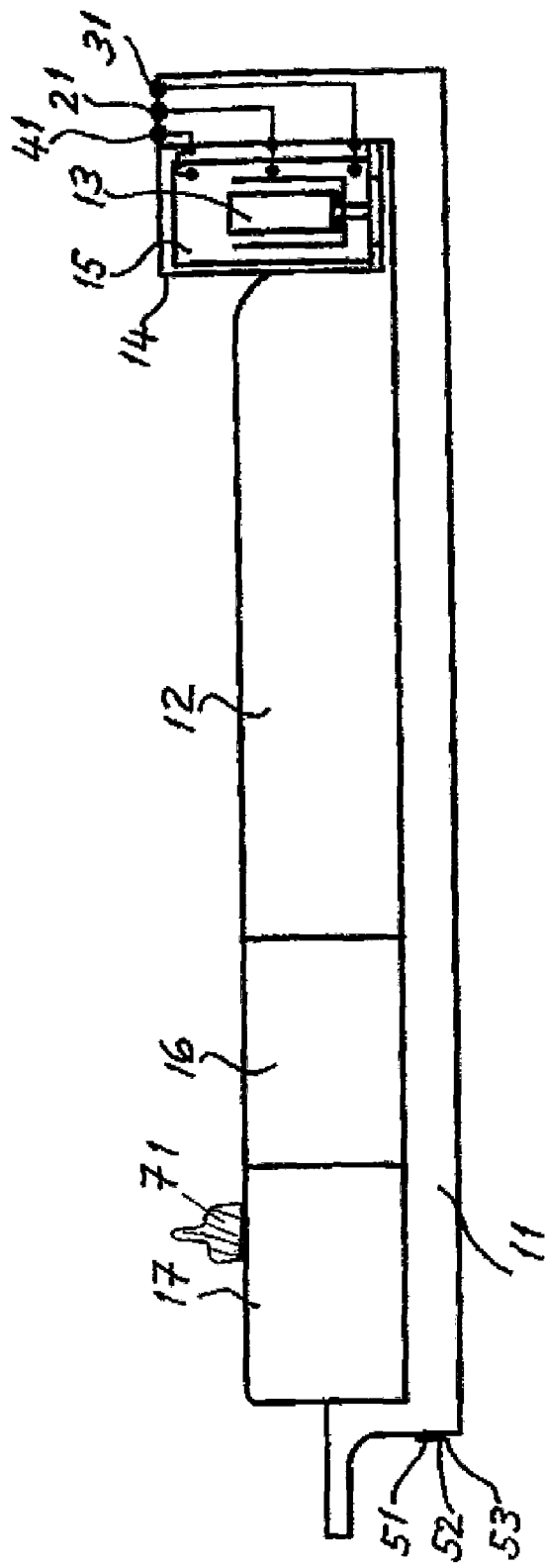
FIG. 2 shows a schematic cross-sectional view along the length symmetry axis of the embodiment shown by FIG. 1.
Figure 3:
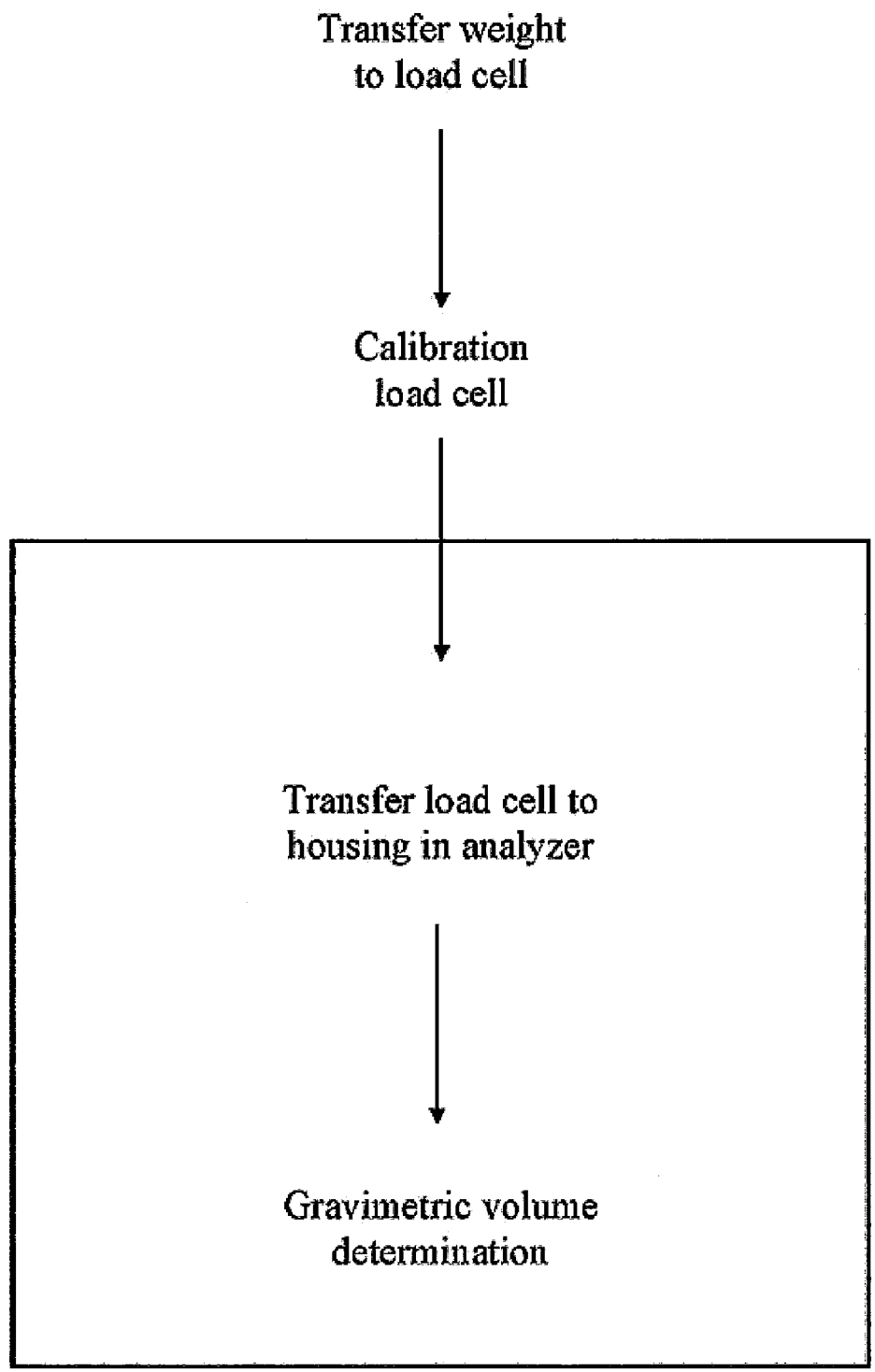
FIG. 3 is a flow diagram of a first embodiment of the gravimetric determination method of the present invention.
Figure 4:
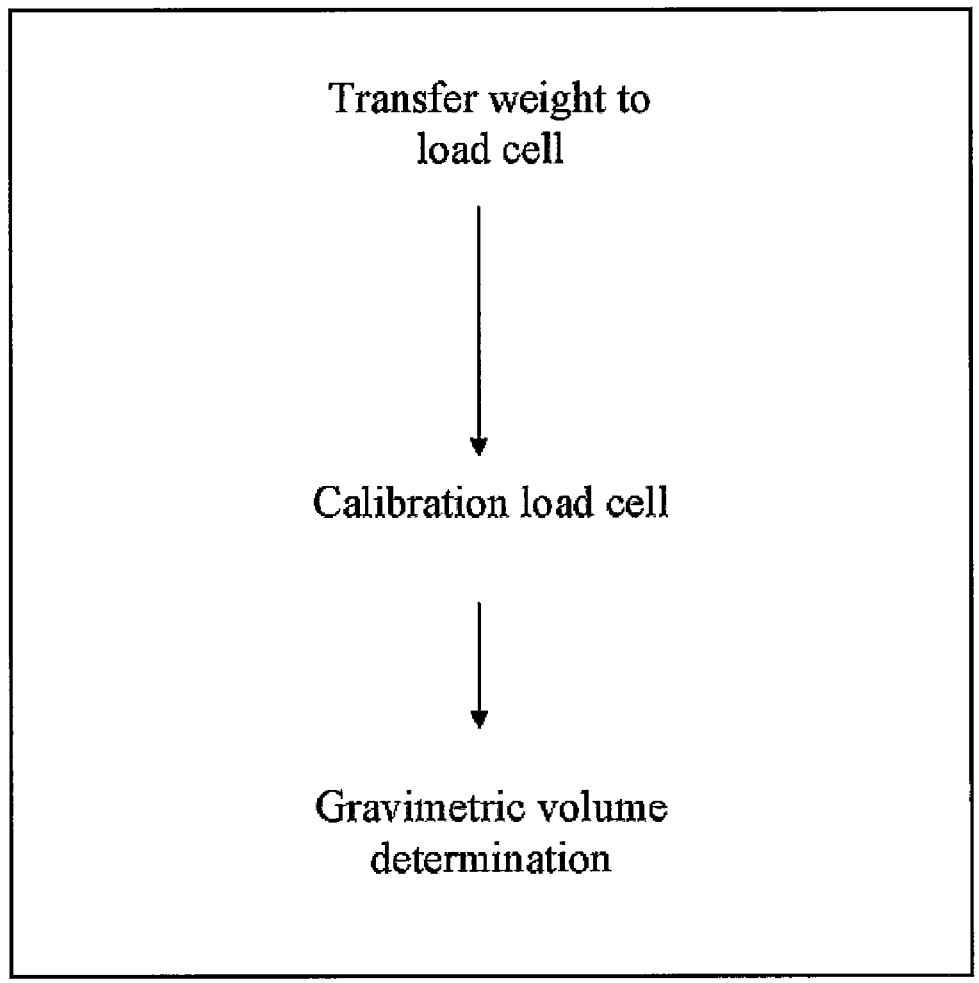
FIG. 4 is a flow diagram of a second embodiment of the gravimetric determination method of the present invention.

As shown by FIGS. 1 and 2 such a device comprises a housing 11 which can have the same shape and dimensions as a standard rack used in a clinical diagnostic analyzer system for holding sample or reagent containers. In a certain embodiment, the dimensions of housing 11 do not exceed the following values: length=415 millimeter, width=36 millimeter and height=90 millimeter. The structure of the device according to the invention thus makes it possible to accommodate all components required for performing gravimetric volume determinations in a much reduced space, which is much smaller than the space occupied by conventional apparatuses for that purpose.

As shown by FIGS. 1 and 2 the following components can be contained in housing 11:
- a load cell 12 (also called a weighing cell) for gravimetric volume determination,
- a weighing container 13 for receiving a liquid to be weighed with load cell 12,
- a windbreak 14 which shields weighing container 13 from air flow,
- an evaporation trap 15 which prevents evaporation of liquid loaded into weighing container 13,
- a temperature sensor 21, an air-pressure sensor 31 and a humidity sensor 41 for sensing temperature, air pressure and humidity respectively at predetermined points within housing 11, and,
- an electronic processing unit 16 for processing electrical signals delivered by load cell 12 and by sensors 21, 31, 41.

Electronic processing unit 16 has e.g. USB-, Bluetooth and RS-232 interface connections.

The device shown by FIGS. 1 and 2 includes all necessary electrical connections connecting load cell 12 and sensors 21, 31, 41 to electronic processing unit 16, but these connections are not shown in FIGS. 1 and 2.

In a certain embodiment load cell 12 is e.g. a 5-digit digital load cell for weights in the range from 0 to 5 grams. Such a load cell is suitable for gravimetric volume determinations in the nanoliter and microliter range.

In a certain embodiment temperature sensor 21 comprises a sensor element 22 for sensing the temperature of weighing container 13 and a sensor element 23 for sensing the temperature within windbreak 14.

In a certain embodiment air-pressure sensor 31 comprises a sensor element 32 for sensing air pressure within windbreak 14 and a sensor element 33 for sensing air pressure within evaporation trap 15.

In certain embodiment humidity sensor 41 comprises a sensor element 42 for sensing humidity within windbreak 14 and a sensor element 43 for sensing humidity within evaporation trap 15.

In a certain embodiment housing 11 further contains a rechargeable battery 17 for supplying electrical energy required for operating load cell 12 and electronic processing unit 16.

A certain embodiment of a device according to the invention further comprises an identification barcode label 61 attached to the outer surface of one side of housing 11.

The device also comprises a calibration weight 71.

Figure 5:
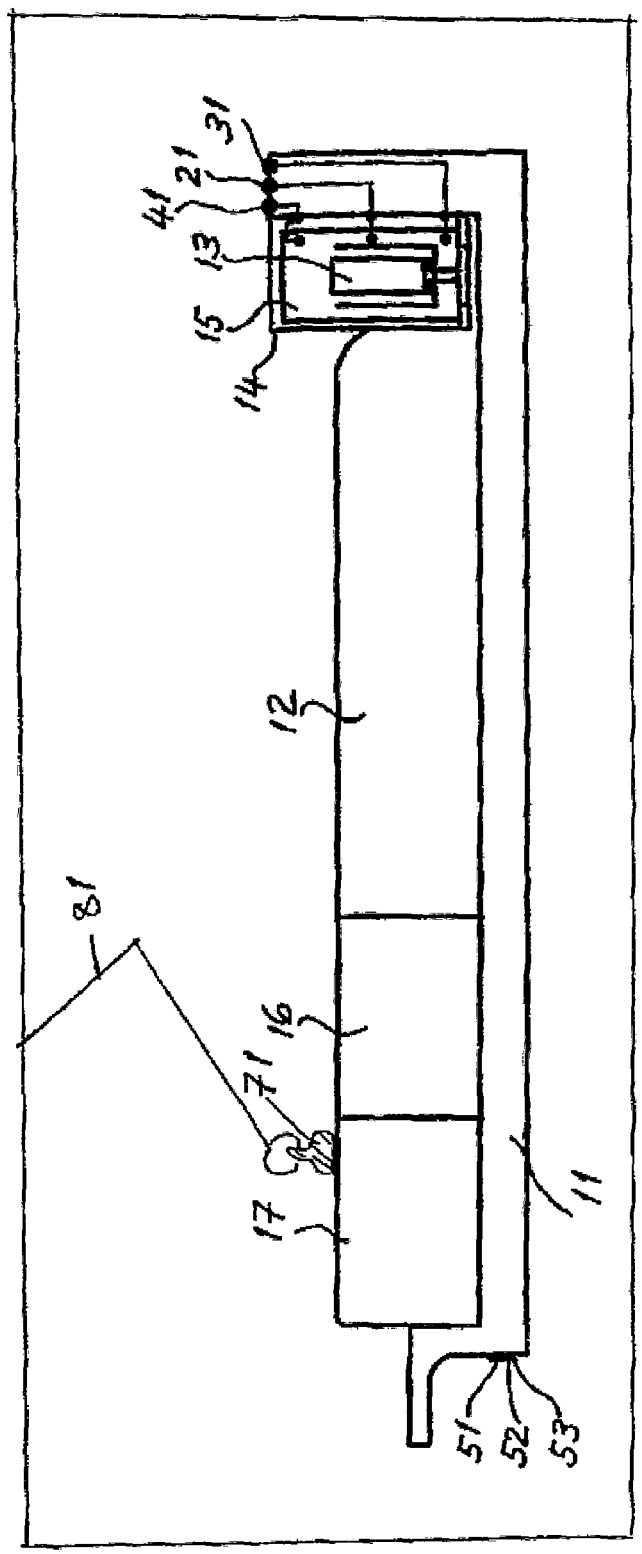
FIG. 5 shows an analytical system with housing, load cell and a weight and a handler.

The operation of the device shown by FIGS. 1, 2 and 5 is essentially as follows.

This device is positioned in the clinical diagnostic analyzer system in a location identical or similar to the one provided therein for receiving a rack for samples or a rack for reagents. The load cell 12 is calibrated by moving calibration weight 71 with a handler 81 and placing it in load cell 12. The known weight of calibration weight 71 is used to calibrate the load cell. Then an amount of a liquid the volume of which is to be determined is pipetted into weighing container 13 automatically with the automatic pipetting device of the analyzer and after the weighing step is done the liquid is removed from weighing container 13 by the same automatic pipetting device. Electrical output signals representative of the temperature, air pressure and humidity data obtained with sensors 21, 31, 41 respectively as well as the output signal representative of the weighing result obtained with load cell 12 are each directly transmitted to electronic processing unit 16. Electronic processing unit 16 calculates the volume corresponding to the measured weighing result taking into account all above mentioned parameters (temperature, air pressure, humidity) and provides an output signal corresponding to the calculated volume value to the electronic data processing unit of the clinical diagnostic analyzer system. Display and/or further processing of the calculated volume value are performed by suitable means available in the clinical diagnostic analyzer system.

An example of a method for the gravimetric volume determination of a liquid volume carried out with the above described device according to the invention comprises the following steps:
- (a) transporting the weight for calibration to the load cell,
- (b) calibrating the load cell 12 with the weight,
- (c) introducing a liquid sample to be weighed into the load cell 12 and transmitting an output signal generated by the load cell 12 to the electronic processing unit 16, the output signal being representative of the weight of the sample,
- (d) measuring the temperature of the environment of load cell 12 with the temperature sensor 21 and transmitting an output signal generated by this sensor to the electronic processing unit 16,
- (e) measuring the air pressure of the environment of load cell 12 with the air-pressure sensor 31 and transmitting an output signal generated by this sensor to the electronic processing unit 16,
- (f) measuring the humidity of the environment of load cell 12 with humidity sensor 41 and transmitting an output signal generated by this sensor to the electronic processing unit 16,
- (g) processing in the electronic processing unit 16 the output signals generated according to steps (a) to (d), the processing including the calculation of the volume of the liquid sample which corresponds to the weight of the liquid sample measured with load cell 12.

Introducing a liquid sample in step (a) can comprise the steps of:
(a1) aspirating a liquid sample to be weighed with an automatic pipetting device in a clinical diagnostic analyzer, and
(a2) delivering the sample to the load cell 12 with the pipetting device.

In a certain embodiment, the method according to the invention can comprise the following additional steps:
(1) acclimatization of the load cell 12,
(2) evaluating the measured values of the temperature, air pressure and humidity of the environment of load cell 12,
(3) filling the evaporation trap 15, with a liquid,
(4) filling the weighing container with a calibrator liquid,
(5) measuring and evaluating the temperature, air pressure and humidity within the interior of windbreak 14,
(6) calculating and evaluating the evaporation rate per time interval,
(7) starting the measurement when the conditions (including temperature, air pressure and humidity) are within acceptable limits,
(8) pipetting from or into the weighing container,
(9) simultaneously recording all measured values (weight, temperature, etc),
(10) computing the result (optionally in real time): Volume= (weight)*density coefficient.

In a certain embodiment, a diagnostic analyzer system in which a device according to the invention is used comprises at least one standard rack for receiving sample and/or reagent containers and an area for receiving at least one such rack. Since the device according to the present application has a housing which has the same shape and dimensions as the sample and/or reagent rack of the analyzer, the device according to the invention is adapted for being installed in the analyzer at a location otherwise available for a standard sample and/or reagent rack of the analyzer. The analyzer further comprises a handler to transport the calibration weight 71 to the load cell 12 for calibration of the load cell 12. This allows for a fully automated calibration of the device.

Examples of uses of a method and a device according to the invention comprise:
  Disposable free verification of pipetted volumes with discretionary repetition rate or any repetition rate.
  Execution of automatic calibration procedures for the verification of the accuracy of volumes pipetted with instruments being used in their normal field of use.
  Fully or partially automated determination of pipetting parameters.
  Study of the pipetting behavior of different liquids.

REFERENCE NUMERALS USED IN DRAWINGS

11 housing
12 load cell/weighing cell
13 weighing container
14 windbreak
15 evaporation trap
16 electronic processing unit
17 battery
21 temperature sensor
22 temperature sensor element
23 temperature sensor element
31 air-pressure sensor
32 air-pressure sensor element
33 air-pressure sensor element
41 humidity sensor
42 humidity sensor element
43 humidity sensor element
51 RS232-interface connection
52 USB-interface connection
53 Bluetooth-interface connection
61 identification barcode label
71 calibration weight
81 handler Although certain embodiments of the invention have been described using specific terms, such description is for illustrative purposes only, and it is to be understood that changes and variations may be made without departing from the spirit or scope of the following claims.

The invention claimed is:

1. A method for the gravimetric volume determination of a liquid volume in a clinical diagnostic analyzer comprising:
  (a) calibrating a load cell, at a determined positioning, outside an analytic system using an internal or external weight for calibration,
  (b) introducing said load cell into a housing,
  (c) adjusting the positioning of said load cell to correspond to the positioning of said load cell during step (a),
  (d) introducing said housing with said load cell into an analytic analyzer,
  (e) introducing a liquid sample to be weighed into said load cell and transmitting an output signal generated by said load cell to an electronic processing unit, said output signal being representative of the weight of said liquid sample,
  (f) measuring the temperature of the environment of said load cell with a temperature sensor and transmitting an output signal generated by said temperature sensor to the electronic processing unit,
  (g) measuring the air pressure of the environment of said load cell with an air-pressure sensor and transmitting an output signal generated by said pressure sensor to the electronic processing unit,
  (h) measuring the humidity of the environment of said load cell with a humidity sensor and transmitting an output signal generated by said humidity sensor to the electronic processing unit, and
  (i) processing in the electronic processing unit the output signals generated according to steps (a) to (e), said processing including the calculation of the volume of the liquid sample which corresponds to the weight of the liquid sample measured with said load cell.

2. A method for the gravimetric volume determination of a liquid volume in a clinical diagnostic analyzer comprising:
  (a) introducing a load cell into a housing,
  (b) calibrating said load cell, at a determined positioning, outside an analytic system using an internal or external weight for calibration,
  (c) adjusting the positioning of said load cell to correspond to the positioning of said load cell during step (b),
  (d) introducing said housing with said load cell into an analytic analyzer,
  (e) introducing a liquid sample to be weighed into said load cell and transmitting an output signal generated by said load cell to an electronic processing unit, said output signal being representative of the weight of said liquid sample,
  (f) measuring the temperature of the environment of said load cell with a temperature sensor and transmitting an output signal generated by temperature sensor to the electronic processing unit,
  (g) measuring the air pressure of the environment of said load cell with an air-pressure sensor and transmitting an output signal generated by said air-pressure sensor to the electronic processing unit,
  (h) measuring the humidity of the environment of said load cell with a humidity sensor and transmitting an output signal generated by said humidity sensor to the electronic processing unit, and (i) processing in the electronic processing unit the output signals generated according to steps (a) to (e), said processing including the calculation of the volume of the liquid sample which corresponds to the weight of the liquid sample measured with said load cell.

3. A method for the gravimetric volume determination of a liquid volume in a clinical diagnostic analyzer comprising the automated steps of:

(a) transporting a weight for calibration to a load cell, (b) calibrating said load cell with said weight, (c) introducing a liquid sample to be weighed into said load cell and transmitting an output signal generated by the load cell to an electronic processing unit, said output signal being representative of the weight of said sample, (d) measuring the temperature of the environment of said load cell with a temperature sensor and transmitting an output signal generated by said temperature sensor to the electronic processing unit, (e) measuring the air pressure of the environment of said load cell with an air-pressure sensor and transmitting an output signal generated by said air-pressure sensor to the electronic processing unit, (f) measuring the humidity of the environment of said load cell with a humidity sensor and transmitting an output signal generated by said humidity sensor to the electronic processing unit, and (g) processing the output signals generated according to steps (a) to (d), in the electronic processing unit said processing including calculation of the volume of the liquid sample which corresponds to the weight of the liquid sample measured with said load cell.

4. The method according to claim 3, wherein said weight is transported by a handler.

5. The method according to claim 1, wherein said introducing of a liquid sample in step (b) comprises:

(b1) aspirating a liquid sample to be weighed with an automatic pipetting device in a clinical diagnostic analyzer, and (b2) delivering said sample to said load cell with said pipetting device.

6. The method according to claim 2, wherein said introducing of a liquid sample in step (b) comprises:

(b1) aspirating a liquid sample to be weighed with an automatic pipetting device in a clinical diagnostic analyzer, and (b2) delivering said sample to said load cell with said pipetting device.

7. A diagnostic analyzer system comprising:

(i) a housing containing:
    a load cell for gravimetric volume determination,
        a weighing container for receiving a liquid to be weighed with said load cell,
        a windbreak which shields said weighing container from air flow,
        an evaporation trap which prevents evaporation of liquid loaded into said weighing container,
        a temperature sensor, an air-pressure sensor and a humidity sensor for sensing temperature, air pressure and humidity respectively at predetermined points within said housing,
        an electronic processing unit for processing electrical output signals delivered by said load cell and by said sensors,
        a weight for calibrating said load cell, and (ii) a handler for transporting said weight to said load cell.

* * * * *